3,413,337
SULFOXIDATION PROCESS
Howard W. Bost, Bartlesville, Okla., assignor to Phillips Petroleum Company, a corporation of Delaware
No Drawing. Filed Oct. 18, 1965, Ser. No. 497,472
10 Claims. (Cl. 260—513)

ABSTRACT OF THE DISCLOSURE

Sulfoxidation of saturated hydrocarbons is carried out in the presence of $SO_2$, oxygen and a reaction initiator plus a silver, platinum, palladium or cadmium catalyst.

---

This invention relates to the preparation of sulfonic acids. In accordance with one aspect, this invention relates to the preparation of aliphatic sulfonic acids from saturated hydrocarbons by reaction with sulfur dioxide, oxygen, and a reaction initiator in the presence of a catalyst. In accordance with another aspect, this invention relates to a process for increasing the yield of sulfonic acid per unit of time from the reaction of a saturated hydrocarbon with sulfur dioxide and oxygen in the presence of a reaction initiating amount of ozone by carrying out the process in the presence of metals and metal compounds in which the metal is selected from silver, platinum, palladium and cadmium.

The econmic production of sulfonic acids by the so-called sulfoxidation reaction has been extensively investigated. Aliphatic sulfonic acids, for example, have been prepared from saturated aliphatic hydrocarbons by the reaction therewith of sulfur dioxide and oxygen employing various reaction initiators, including actinic light, hydroperoxide, peroxides, and ozone. The use of ozone as the reaction initiator in a sulfoxidation process is very attractive from a commercial standpoint, as the oxygen stream can be passed through an Ozonator just upstream of the sulfoxidation reactor, and the resulting oxygen-ozone mixture can then be utilized directly. However, the yields from an ozone-initiated sulfoxidation reaction are not sufficiently high to warrant ready acceptance of this process for commercial use.

In accordance with the present invention, certain metal-containing catalysts have been found quite effective for increasing the yields of sulfonic acid per unit of time in an ozone-initiated sulfoxidation reaction.

Accordingly, it is an object of this invention to provide novel catalysts for the ozone-oxygen sulfoxidation of hydrocarbons.

A further object of this invention is to provide an improved process for the conversion of saturated hydrocarbons to sulfonic acids in increased yields.

Another object of this invention is to provide a commercially feasible and acceptable ozone-initiated sulfoxidation process.

Other aspects, objects, as well as the several advantages of the invention will be apparent from this disclosure and the appended claims.

Broadly, an improved process for the sulfoxidation of organic materials is provided whereby the reaction is carried out in the presence of novel catalysts comprising selected metals and metal compounds in which the metal is selected from silver, platinum, palladium and cadmium.

More particularly, according to the invention, a process for the production of increased yields of sulfonic acids is provided which comprises contacting (a) a saturated hydrocarbon having up to and including about 24 carbon atoms per molecule, with (b) sulfur dioxide and oxygen and ozone as a reaction initiator in the presence of (c) a catalytic amount of a catalyst selected from metals and metal compounds in which the metal is selected from silver, platinum, palladium and cadmium.

More specifically, according to the process of this invention, the yield of sulfonic acid per unit of time from the reaction of a saturated hydrocarbon selected from aliphatic and cycloaliphatic hydrocarbons having up to and including about 24 carbon atoms with oxygen and sulfur dioxide in the presence of a reaction-initiating amount of ozone can be improved by effecting said reaction in the presence of a catalytic amount of a metal or metal compound as set forth above. The metal catalyst can be supplied to the reaction zone as the elemental metal or as compounds such as the oxides and salts.

As described above, the catalysts which are to be employed in the sulfoxidation reaction of this invention are metals or metal compounds of silver, platinum, palladium and cadmium. These can be supplied to the reaction as the metals, oxides and salts, including such typical salts as the nitrates and sulfates; salts of organic acids such as the formates and acetates; halides such as the chlorides, iodides, and bromides, and complex salts containing these metals.

Representative examples of suitable metals and metal compounds that can be employed according to the invention include:

silver nitrate
cadmium nitrate
silver perchlorate
cadmium oxide
silver oxide
platinum
palladium chloride
cadmium iodide
platinous bromide
silver acetate
cadmium formate
palladium sulfate
platinic oxide
silver
silver nitroplatinite
palladium nitrate and the like.

The process of the present invention is carried out by contacting a saturated hydrocarbon with $SO_2$ and oxygen, preferably in the presence of ozone as a reaction initiator and one of the above-defined catalysts. The chosen hydrocarbon to be sulfoxidized and thus converted to sulfonic acids will depend, to a great extent, on the desired use of the product sulfonic acid. Any saturated hydrocarbon aliphatic in character, i.e., any saturated aliphatic or cycloaliphatic hydrocarbon, can be employed in this sulfoxidation reaction to form sulfonic acids. This category includes saturated aliphatic straight chain and branched chain hydrocarbons as well as saturated alicyclic hydrocarbons. Generally speaking, hydrocarbons containing from 1 to 24 carbon atoms, preferably 4 to 20 carbon atoms, will be converted to the corresponding sulfonic acids by this process. As indicated above, the process of the invention is applicable for the sulfoxidation of both branched chain and straight chain alkanes, but it is preferred to utilize straight chain alkanes in this process, as the sulfonic acids which are produced have utility in the detergent area. By employing a straight chain alkane, the produced sulfonic acids having wetting properties are also degradable by bacterial action.

Some examples of saturated aliphatic or cycloaliphatic hydrocarbons which can be sulfoxidized by the process of this invention are:

butane
isobutane n-hexane
isooctane
n-decane
n-dodecane
n-hexadecane (cetane)
n-eicosane
n-tetraeicosane
cyclyohexane
methane
naphthenic oils and the like.

The process of this invention is carried out at a temperature generally ranging from 0–75° C., preferably below 50° C., and still more preferably between 15 and 30° C. The color of the produced sulfonic acids is improved by operation at lower temperatures, but at these lower temperatures the rate of sulfoxidation decreases significantly, and significant amounts of peroxide appear in the product. If desired, actinic light, peroxides, hydroperoxides, or ozone can be used as the reaction initiator. Ozone is presently preferred.

In the sulfoxidation reaction, the mole ratio of $SO_2/O_2$ should be at least 1/1, but it is preferred to utilize an excess of $SO_2$. Thus, the mole ratios of $SO_2/O_2$ can range as high as 2.5–3.0/1, but it is preferred to operate at about 10 percent excess $SO_2$. The reaction is conveniently carried out by charging the hydrocarbon to be sulfoxidized to the sulfoxidation reactor along with the catalyst to be employed. Following this, $SO_2$, oxygen and ozone, or other reaction initiators, are then passed into the reactor in the desired amount, utilizing a sufficiently high feed rate of $SO_2$ so as to maintain the concentration of dissolved $SO_2$ in the hydrocarbon at saturation. The $SO_2$, oxygen and ozone, or other reaction initiator, can be passed to the reactor in single streams or in a mixed stream, or in any combination of mixed streams. In a preferred embodiment, it is most convenient to pass the oxygen stream through an ozonator so as to form the desired amount of ozone and then pass this mixture of ozone and oxygen directly into the reactor, either per se or in admixture with the $SO_2$. The thus-formed sulfonic acids separate out at the bottom of the sulfoxidation reactor. This material can be drawn off continuously or intermittently as desired. The amount of ozone in the oxygen-ozone mixture will generally range from about 0.5 weight percent to about 10 weight percent, and if they are supplied in separate streams, the relative amounts employed will be within the same range.

The amount of metal ion supplied as the catalyst for this reaction can vary over a wide range. Generally, the amount of supplied metal, metal oxide or metal salt will fall within the range of from 0.05 weight percent to 5 weight percent based on the alkane in the sulfoxidation reactor.

As another advantage of this process, it was described above that lower temperatures lead to alkanesulfonic and cycloalkanesulfonic acids of improved color. When operating in the preferred temperature range, the produced sulfonic acids are colored to some extent ranging from a light yellow to black in the case of high temperature reactions. The use of ozone as the reaction initiator has the dual benefit of effecting some decolorizing of this material. It is also within the scope of this invention to further treat the produced sulfonic acids with ozone after removal of the sulfonic acids from the sulfoxidation reactor.

The sulfonic acids which are produced by the process of this invention can be converted to the corresponding alkali metal or ammonium salts and utilized directly as wetting agents, emulsifiers and detergents. Prior to the formation of the alkali metal salts, it is advantageous, in some cases, to treat the sulfonic acid with a material to remove the very slight amounts of catalyst present. For example, silver compounds can be precipitated by the addition of HCl. By effecting this treatment prior to conversion to alkali metal or ammonium salts, one avoids the formation of hydroxides of the metal ion employed as the catalyst.

The following specific example contains a series of runs which clearly show the advantage of employing the catalyst of this invention.

Example I

A series of runs was carried out in which n-dodecane was converted to dodecanesulfonic acid by sulfoxidation with $SO_2$ and oxygen in the presence of ozone and in the presence or absence of metal catalysts of this invention.

In these runs, 2700 ml. of n-dodecane was charged to a 3-liter reaction vessel which comprised a glass reactor having an enlarged bottom of approximately 1 liter capacity and a 4 inch diameter upper section having approximately a 2 liter capacity. Two fritted sparge tubes were mounted just above the enlarged section with $SO_2$ feeding one frit and an oxygen-ozone mixture feeding the other frit. The reaction was carried out by passing .04 cubic foot per minute of oxygen containing 65–75 milligrams of ozone per liter in the one frit and simultaneously passing 0.44 cubic foot per minute of $SO_2$ into the other frit. The reaction was continued for several hours to obtain a base level for productivity of dodecanesulfonic acid in grams per hour. Product dodecanesulfonic acid was drawn off intermittently from the bottom of the reactor, and make-up dodecane was added to maintain the dodecane level in the reactor at 2500–2700 ml. By measurement of the amount of dodecanesulfonic acid drawn off, the productivity level was determined. When this productivity level had stabilized, the candidate catalyst was charged to the reactor. The run was continued, and the productivity level was again determined over a several hour period.

The results of these runs are attached as Table I.

TABLE I

| Run | Catalyst | Amount of catalyst, g. | Baseline productivity rate, grams per hour | Temperature, ° C. | Time to maximize productivity rate after catalyst addition, hours | Maximum productivity rate, grams per hour |
| --- | --- | --- | --- | --- | --- | --- |
| 1 | Silver gauze | 22 | 103 | 21 | 2 | 185 |
| 2 | do | [1] 62 | 103 | 24 | 5 | 235 |
| 3 | Platinum gauze | 4.85 | 120 | 52 | 4.5 | 250 |
| 4 | Silver nitrate | 5 | 93 | 45 | 1.5 | 317 |
| 5 | Cadmium nitrate | 5 | 120 | 47 | 1 | 281 |
| 6 | Silver perchlorate | 10 | 101 | 25 | 1 | 174 |
| 7 | Zinc chloride | 5 | 125 | 20 | 2.84 | [2] 107 |

[1] In this run, 40 grams of silver gauze was added to the reaction mixture of run 2, thus bringing the total to 62 grams of silver gauze.
[2] This run clearly shows that zinc chloride is not a satisfactory catalyst. Not only did the productivity rate drop from 125 grams per hour to 107 grams per hour, but the temperature dropped to 19° C. upon addition of this material. The temperature drop is also indicative that this material was not functioning in the same manner that the silver, platinum and cadmium ions did in the runs demonstrating the invention.

It will be observed from the preceding table that a substantial improvement in productivity (last column of table) was realized with the catalyst of the invention, specifically runs 1–6.

Reasonable variation and modification are possible within the scope of the foregoing disclosure, the essence of which is that the yield of sulfonic acids per unit of time from the reaction of a saturated hydrocarbon with oxygen and $SO_2$ in the presence of a reaction initiator is materially improved by effecting said reaction in the presence of a catalytic amount of a metal or metal compound in which the metal is selected from silver, platinum, palladium or cadminum.

I claim:

1. A process for the production of sulfonic acids which comprises contacting (a) a saturated hydrocarbon, aliphatic in character, having up to and including about 24 carbon atoms per molecule, with (b) $SO_2$ and oxygen and a reaction initiator in the presence of (c) a catalytic amount of a catalyst selected from metals, oxides and the nitrate, sulfate, formate, acetate and halide salts of said metals in which the metal is selected from silver, platinum, palladium and cadmium silver perchlorate and silver nitroplatinite.

2. A process according to claim 1 wherein said reaction initiator is ozone.

3. A process according to claim 1 wherein the temperature of said reaction ranges from 0–75° C.

4. A process according to claim 1 wherein an excess of $SO_2$ is employed.

5. A process according to claim 2 wherein said hydrocarbon is an alkane and wherein a mixture of ozone and oxygen is used, which mixture contains from 0.5 to 10 weight percent ozone.

6. A process according to claim 1 wherein the amount of catalyst present ranges from 0.5 to 5 weight percent of the hydrocarbon during said contacting.

7. A process according to claim 1 wherein said hydrocarbon is n-dodecane.

8. A process according to claim 7 wherein said catalyst is selected from silver, silver nitrate and silver perchlorate.

9. A process for the production of sulfonic acids which comprises contacting (a) n-dodecane with (b) $SO_2$ and oxygen and a reaction initiator in the presence of (c) a catalytic amount of a platinum catalyst.

10. A process for the production of sulfonic acids which comprises contacting (a) n-dodecane with (b) $SO_2$ and oxygen and a reaction initiator in the presence of (c) a catalytic amount of a cadmium nitrate catalyst.

References Cited

UNITED STATES PATENTS

| | | | |
|---|---|---|---|
| 3,260,741 | 7/1966 | MacKinnon et al. | 260—513 |
| 2,507,088 | 1/1948 | Bradley | 260—513 |
| 2,061,620 | 6/1932 | Downing et al. | 260—513 |

OTHER REFERENCES

Gilbert, Sulfonation and Related Reactions, 1965, pp. 131–134.

DANIEL D. HORWITZ, *Primary Examiner.*

J. NIELSEN, *Assistant Examiner.*